(12) United States Patent
Liu et al.

(10) Patent No.: US 7,379,071 B2
(45) Date of Patent: May 27, 2008

(54) GEOMETRY-DRIVEN FEATURE POINT-BASED IMAGE SYNTHESIS

(75) Inventors: Zicheng Liu, Bellevue, WA (US); Baining Guo, Beijing (CN); Heung-Yeung Shum, Beijing (CN); Qingshan Zhang, Shenzhen (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/684,773

(22) Filed: Oct. 14, 2003

(65) Prior Publication Data

US 2005/0078124 A1   Apr. 14, 2005

(51) Int. Cl.
  *G09G 5/00* (2006.01)
(52) U.S. Cl. ............... 345/582; 345/646; 382/118; 382/171
(58) Field of Classification Search ........ 345/629–641; 382/298–300
  See application file for complete search history.

(56) References Cited

U.S. PATENT DOCUMENTS

| | | | | |
|---|---|---|---|---|
| 5,991,459 | A * | 11/1999 | Fogel | 382/264 |
| 2001/0031081 | A1* | 10/2001 | Quan et al. | 382/154 |
| 2001/0036860 | A1* | 11/2001 | Yonezawa | 463/30 |
| 2002/0097380 | A1* | 7/2002 | Moulton et al. | 352/5 |
| 2003/0190091 | A1* | 10/2003 | Stewart et al. | 382/294 |
| 2003/0202686 | A1* | 10/2003 | Rowe | 382/118 |
| 2003/0223622 | A1* | 12/2003 | Simon et al. | 382/118 |
| 2004/0075667 | A1* | 4/2004 | Burky et al. | 345/589 |
| 2005/0084151 | A1* | 4/2005 | Aggarwal et al. | 382/167 |

OTHER PUBLICATIONS

Cosatto, E. and H. Graf. "Photo-Realistic Talking Heads from Image Samples." IEEE Trans. on Multimedia, vol. 2, No. 3, Sep. 2000, pp. 152-163.*
Chai, J.; Jing, X.; Hodgins, J. "Vision-based control of 3D facial animation." Proc. 2003 ACM SIGGRAPH/Eurgraphics Symp. on Comp. Animation. pp. 193-206, 2003.*
A. Lanitis, C. J. Taylor, and T. F. Cootes, "Automatic interpretation and coding of face images using flexible models," IEEE Trans. on PAMI, vol. 19, No. 7, pp. 743-756, 1997.*
U.S. Appl. No. 10/099,673, filed Mar. 14, 2002, Guo et al.
Beymer, D. and Poggio, T. Image representation for visual learning. Science, 272(28):1905-1909, Jun. 1996.
Bichsel, M. Automatic interpolation and recognition of face by morphing. In Proc. 2nd Intl. Conf. on Automatic Face and Gesture Recogniton. Los Alamitos, CA, 128-135, 1996.
Black, M.J. and Yacoob, Y. Tracking and recognizing rigid and non-rigid facial motion using local parametric models of image motion. In Proc. IEEE Intl. Conf. Computer Vision, Cambridge, MA, 374-381, 1995.
Breglar, C., Covell, M. and Slaney, M. Video rewrite: Driving visual speech with audio. In Proc. SIGGRAPH'97, 353-360, Jul. 1997.

(Continued)

*Primary Examiner*—Mark Zimmerman
*Assistant Examiner*—Kevin K Xu
(74) *Attorney, Agent, or Firm*—Steven M. Koehler; Westman, Champlin & Kelly, P.A.

(57) ABSTRACT

A method and system uses geometry-driven feature point analysis to synthesize images including for example facial expressions. Given the feature point positions (geometry) of an expression, the method automatically synthesizes the corresponding expression image, which has photorealistic and natural looking expression details.

30 Claims, 13 Drawing Sheets

OTHER PUBLICATIONS

Cassell, J. More than just another pretty face: Embodied conversational interface agents. Communications of the ACM 43(4): 70-78, 2000.

Chu-Carroll, J. Form-based reasoning for mixed-initiative dialogue management in information-query systems. In Proc. Eurospeech'99, 1519-1522, 1999.

Cossatto, E. and Graf, H. P. Photo-realistic talking-heads from image samples. IEEE Trans. on Multimedia, 2(3), Sep. 2000.

Dahlbäck, N. Towards a dialogue taxonomy. In Proceedings of ECAI'96 Workshop Dialogue Processing in Spoken Language Systems, 28-34, 1996.

Escher, M. and Magnenat-Thalmann, N. Automatic 3D cloning and real-time animation of a human face. In Proc. Computer Animation, 58-66, 1997.

Ferguson, G. and Allen, J. TRIPS: An Integrated Intelligent Problem-Solving Assistant. In Proceedings of the Fifteenth National Conference on Artificial Intelligence (AAAI-98), Madison, WI, 567-573, Jul. 1998.

Ferguson, G., Allen, J., Miller, B. and Ringger, E. The design and implementation of the TRAINS-96 system: a prototype mixed-initiative planning assistant. TRAINS Technical Note 96-5, Computer Science Dept., University of Rochester, Oct. 1996.

Flycht-Eriksson, A. A survey of knowledge sources in dialogue systems. In Proceedings of IJCAI-99 Workshop on Knowledge and Reasoning in Practical Dialogue Systems, Stockholm, 1999.

Glass, J. et al. The MIT ATIS System: Dec. 1994 Progress Report. In Proc. ARPA Spoken Language Systems Technology Workshop, Jan. 1995.

Guiard-Marigny, T., Adjoudani, A. and Benoit, C. A 3-D model of the lips for Realistic speech Amination. In Proc. Computer Animation '96, IEEE, 80-89, 1996.

Lee, Y., Terzopoulos, D. and Waters, K. Realistic modeling for facial animation. In Proc. SIGGRAPH'95, 55-62, 1995.

Lewis, J. Automated lip-sync: Background and techniques. Journal of Visualization and Computer Animation, 2(4):118-122, 1991.

Lundeberg, M. and Beskow, J. Developing a 3D-agent for the August dialogue system. In Proc. AVSP'99, Santa Cruz, USA, 1999.

Oh, A. H. and Rudnicky, A. Stochastic language generation for spoken dialogue systems. ANLP/NAACL 2000 Workshop on Conversational Systems, 27-32, May 2000.

Paek, T. and Horvitz, E. Conversation as action under uncertainty. In Proc. 16th Conf. on Uncertainty in Artificial Intelligence (UAI-2000), Stanford, CA, Jun. 2000.

Pandzic, I., Ostermann, J. and Millen, D. User evaluation: synthetic talking faces for interactive services. The Visual Computer, 15:330-340, 1999.

Peckham, J. A new generation of spoken dialogue systems: results and lessons from the SUNDIAL project. In Proc. Eurospeech'93, 33-40, 1993.

Riccardi, G. and Gorin, A.L. Stochastic language adaptation over time and state in a natural spoken dialog system. IEEE Trans. on Speech and Audio, 8:3-10, Jan. 2000.

Rudnicky, A., Thayer, E., Constantinides, P., Tchou, C., Shern, R., Lenzo, K., Xu W., and Oh, A. Creating natural dialogs in the Carnegie Mellon Communicator system. In Proc. Eurospeech'99, 1531-1534, 1999.

Rudnicky, A. and Xu, W. An agenda-based dialog management architecture for spoken language systems. IEEE Automatic Speech Recognition and Understanding Workshop, 1999.

Schodl, A. and Szeliski, R. Video textures. In Proc. SIGGRAPH'99, 1999.

Wang, Y. A robust parser for spoken language understanding. In Proc. Eurospeech'99, 1999.

Ward, W. and Pellom, B. The CU Communicator system. IEEE Workshop on Automatic Speech Recognition and Understanding, Keystone, CO, Dec. 1999.

Zue, V. et al. JUPITER: A telephone-based conversational interface for weather information. IEEE Transactions on Speech and Audio Processing, 8(1), Jan. 2000.

N. Badler and S. Platt. Animating facial expressions. In Computer Graphics, pp. 245-252.Siggraph, Aug. 1981.

T.Beier and S.Neely . Feature-based image metamorphosis. In Computer Graphics, pp. 35-42.Siggraph, Jul. 1992.

M. Brand.V oice puppetry. In Computer Graphics, Annual Conference Series, pp. 22-28.Siggraph, Aug. 1999.

B. Choe and H. seok Ko. Analysis and synthesis of facial expression with hand-generated muscle actuation basis. In Proceedings of Computer Animation, 2001.

T.Ezzat, G.Geiger, and T. Poggio. Trainable video realistic speech animation. In Computer Graphics, Annual Conference Series, pp. 388-398.Siggraph, Aug. 2002.

B. Guenter, C. Grimm, D. Wood, H. Malvar, and F. Pighin. Making faces. In Computer Graphics, Annual Conference Series, pp. 55-66. Siggraph, Jul. 1998.

Y. Lee, D. Terzopoulos, and K. Waters. Realistic modeling for facial animation. In Computer Graphics, pp. 55-62.Siggraph, Aug. 1995.

S.Z. Li and L. Gu. Real-time multi-view face detection, tracking, pose estimation, alignment, and recognition. In IEEE Conf. on Computer Vision and Pattern Recognition Demo Summary, 2001.

P. Litwinowicz and L. Williams. Animating images with drawings In Computer Graphics, pp. 235-242. Siggraph, Aug. 1990.

Z. Liu, Y. Shan, and Z. Zhang. Expressive expression mapping with ratio images. In Computer Graphics, Annual Conference Series, pp. 271-276.Siggraph, Aug. 2001.

N. Magneneat-Thalmann, N.E. Primeau, and D. Thalmann. Abstract muscle actions procedures for human face animation. Visual Computer, 3(5):290-297, 1988.

K. Perlin and A. Goldberg. Improv: A system for scripting interactive actors in virtual worlds. In Computer Graphics, Annual Conference Series, pp. 205-216.Siggraph, Aug. 1996.

F. Pighin, J. Hecker, D. Lischinski, R. Szeliski, and D.H. Salesin. Synthesizing realistic facial expressions from photographs. In Computer Graphics, Annual Conference Series, pp. 75-84.Siggraph, Jul. 1998.

F. Pighin, R. Szeliski, and D.H. Salesin. Resynthesizing facial animation through 3d model-based tracking. In International Conference on Computer Vision (ICCV'99), 1999.

S.M. Seize and C.R. Dyer. View morphing. In Computer Graphics, pp. 21-30.Siggraph, Aug. 1996.

D. Terzopoulos and K. Waters. Physically-based facial modeling and animation. Journal of Visualization and Computer Animation, 1(4):73-80, Mar. 1990.

S. Toelg and T. Poggio. Towards and example based image compression architecture for videoconferencing. In MIT Technical Report No. 1494, 1994.

K. Waters. A muscle model for animating three dimensional facial expression. Computer Graphics, 22(4):17-24, 1987.

Williams, Performance-Driven Facial Animation, Computer Graphics, vol. 24, No. 4, pp. 235-242, Aug. 1990.

Noh et al., Expression Cloning, ACM SIGGRAPH 2001 Conference Proceedings, Aug. 12-17.

* cited by examiner

GEOMETRY-DRIVEN FEATURE POINT-BASED IMAGE SYNTHESIS

BACKGROUND OF THE INVENTION

The present invention relates to computer generated graphics, in particular, the modeling and rendering of photorealistic graphics such as facial expressions using a computer.

Computer graphics are used in many different applications including computer games, movies and web pages. With the capability of more powerful computers, photorealistic graphics are becoming more desired in order to provide a more realistic experience to the computer user.

One particular area of focus has been in area of synthesized photorealistic expressions of a human face. One known technique includes "expression mapping" (also called performance driven animation), which has been a popular method to generate facial animations. Using this method, a performer is located in front of a computer that monitors selected points ("feature points") of the performer's face. Motions of the feature points are then used to drive the feature point motions of a different person's synthesized face using the computer. However, one shortcoming of this method is that the method does not produce expression details such as wrinkles caused by skin deformation in the synthesized face. Thus, although the synthesized face includes, for example, eye and mouth movements for various expressions, the synthesized face lacks photorealistic qualities because the corresponding wrinkles, folds, dimples and the like present in the skin for instance in the person's forehead, cheeks, chin, etc. are not consistent with the person's overall expression.

Accordingly, a systematic method for rendering photorealistic facial expressions that include appropriate changes in the skin for a given expression would be very beneficial. Aspects of such a method would be useful in other rendering applications as well.

SUMMARY OF THE INVENTION

A method and system uses geometry-driven feature point analysis to synthesize images including for example facial expressions. Given the feature point positions (geometry) of an expression, the method automatically synthesizes the corresponding expression image, which has photorealistic and natural looking expression details.

In some applications, the number of feature points required by the synthesis system is in general more than what is available, a technique is provided to infer the feature point motions from a subset by using an example-based approach. This technique can be used in an expression mapping system that monitors feature points on a user and translates the user's expression to an image rendered on a computer. Another application of the synthesis method is on expression editing where a user indicates new locations for one or more feature points, while the system interactively generates facial expressions with skin deformation details.

DETAILED DESCRIPTION OF ILLUSTRATIVE EMBODIMENTS

Figure 1:
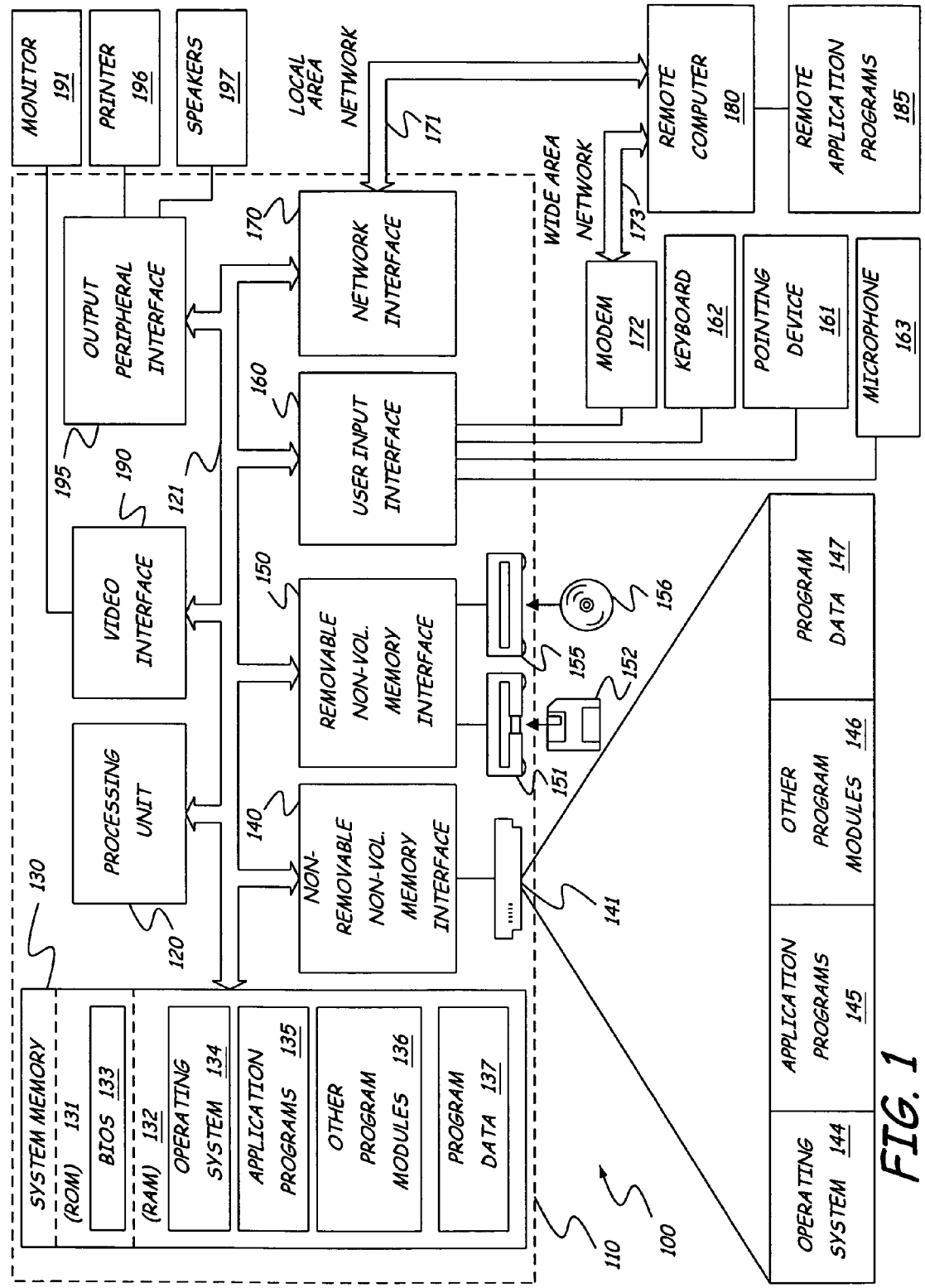
FIG. 1 is a block diagram of an exemplary computing environment for practicing the present invention.

Prior to discussing the present invention in greater detail, an embodiment of an illustrative environment in which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, PAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Overview

One aspect of the present invention is a computer implemented method for rendering a synthesized image that includes generating a geometric component corresponding to a selected image based on identified feature points from a set of example images having the identified feature points; and generating the selected image from a composite of the set of example images based on the geometric component. The exemplary application discussed below for this aspect as well as other aspects of the invention is directed to synthesis of a facial expression of a person. Nevertheless, aspects of the present invention are not intended to be limited to this application and that synthesis of any form of image can benefit from aspects of the present invention including representations of other life forms or non-life forms both realistic and imaginary. Furthermore, "expressions" used herein should not be limited to that of facial expressions, but is to include other forms of expression such as body expressions as well as simply movements associated with feature points for images in general.

Referring now to a facial expression by way of example, given the feature point positions of a facial expression, to compute the corresponding expression image, one possibility would be to use some mechanism such as physical simulation to figure out the geometric deformations for each point on the face, and then render the resulting surface. The problem is that it is difficult to model the detailed skin deformations such as the expression wrinkles, and it is also difficult to render a face model so that it looks photorealistic. One aspect of the present invention is to use set of examples having the feature points and derive from the examples a desired photorealistic image expression having the appropriate wrinkles, folds, dimples, etc.

Given a set of example expressions one can generate photorealistic facial expressions through convex combination. Let $E_i=(G_i, I_i)$, $i=0, \ldots, m$, be the example expressions where $G_i$ represents the geometry and $I_i$ is the texture image. We assume that all the texture images $I_i$ are pixel aligned. Let $$H(E_0, E_1, \ldots, E_m) = \left\{ \left( \sum_{i=0}^{m} c_i G_i, \sum_{i=0}^{n} c_i I_i \right) \middle| \left\{ \left( \sum_{i=0}^{m} c_i = 1, c_i \geq i = 0, \ldots, m \right) \right\} \right\} \quad (1)$$

Pighin et al. in "Synthesizing realistic facial expressions from photographs", *Computer Graphics, Annual Conference Series*, pages 75-84, July 1998 demonstrated this ability and also developed a set of tools so that a user can use it to interactively specify the coefficients $c_i$ to generate the desired expressions.

Notice that each expression in the $H(E_0, E_1, \ldots, E_m)$ has a geometric component $$G = \sum_{i=0}^{m} c_i G_i$$

and a texture component $$I = \sum_{i=0}^{m} c_i I_i.$$

Since the geometric component is much easier to obtain than the texture component, one aspect of the present invention uses the geometric component to infer the texture component. In particular, this method includes given the geometric component G, the geometric component G can be projected to the convex hull spanned by $G_0, \ldots, G_m$. The resulting coefficients are then used to form a composite from the example images to obtain the desired texture image. It should be noted that this technique can be used on many different types of images and is not limited to facial expressions. Facial expressions are used herein as an exemplary application, which by itself is unique and very beneficial, but this example should not be considered limiting.

One problem with this approach is that the space of $H(E_0, E_1, \ldots, E_m)$ can be limited. In the case of facial expression, a person can have expression wrinkles in different face regions, and the combinatorics is very high. In a further embodiment, the image to be synthesized is subdivided into a number of subregions. For each subregion, a geometric component is used and is associated with this subregion to compute the desired subregion texture image. The subregions texture images are then combined, and in a further embodiment blended, to produce the final image.

One potential alternative to the convex combination is to simply use the linear space without adding constraints on the coefficients $c_i$'s. The problem is that the coefficients resulted from the linear space approximation of the geometries may contain negative coefficients as well as coefficients which are larger than 1. This can cause artifacts in the composite image.

System Overview

Figure 2:
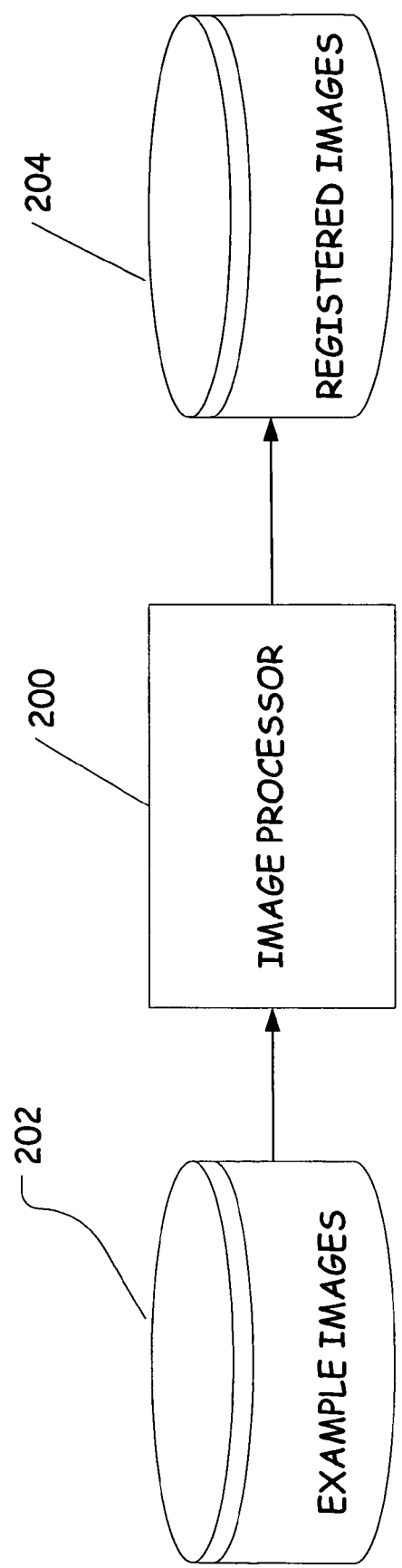
FIG. 2 is a block diagram of an image processor for processing example images.
Figure 3:
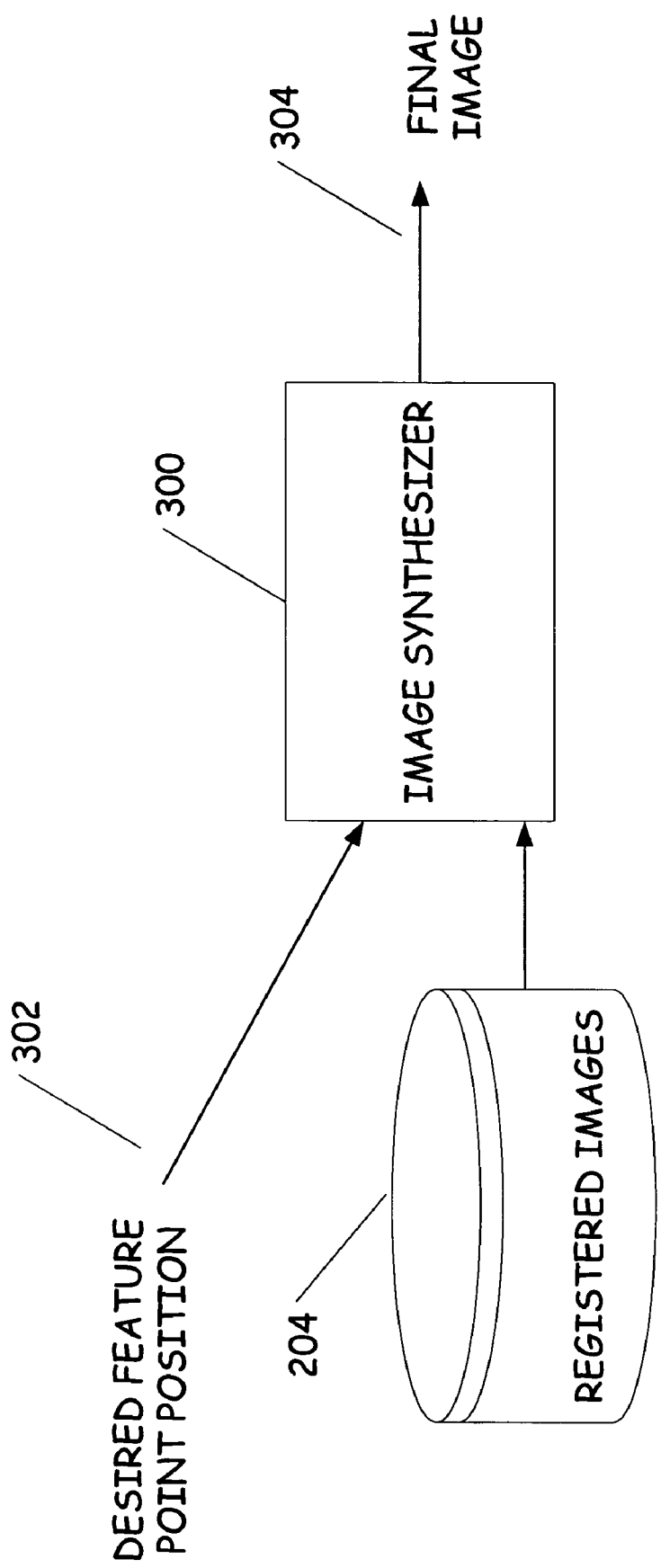
FIG. 3 is a block diagram of an image synthesizer for synthesizing images.

FIGS. 2 and 3 are block diagrams illustrating an image processor 200 and an image synthesizer 300 comprising different aspects of the present invention. Referring to FIG. 2, generally, the image processor 200 receives example images 202 and processes the images to provide a set of registered or representative images that can used during synthesis. Typically, example images 202 are processed offline only once. Details regarding image processing are discussed below.

Processing of Example Images

FIG. 3 illustrates the image synthesizer 300. At run time, the synthesizer 300 receives as an input 302 the feature point positions of a desired new image such as a facial expression, accesses registered images 204 and produces a final image 304. Details regarding image synthesis are also discussed below.

Figure 4:
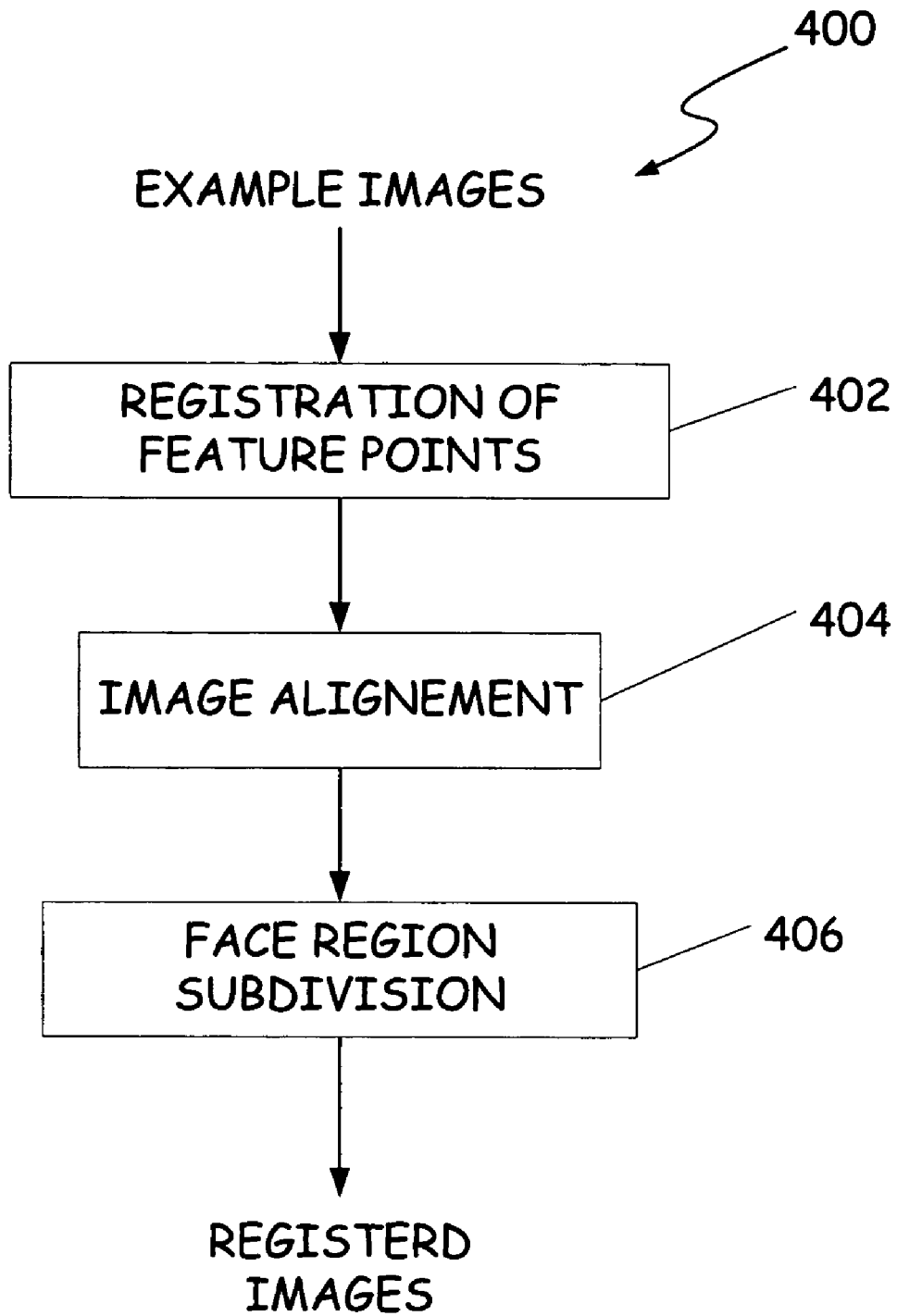
FIG. 4 is a flow chart of a method for processing example images.

A method for image processing to generate registered or representative images is illustrated in FIG. 4 at 400. At step 402, feature points are identified on each of the example images 202. The feature points denote portions of the image that will be used during synthesis. The feature points may or may not include the subtle details that enable a photorealistic-synthesized image.

Figure 5:
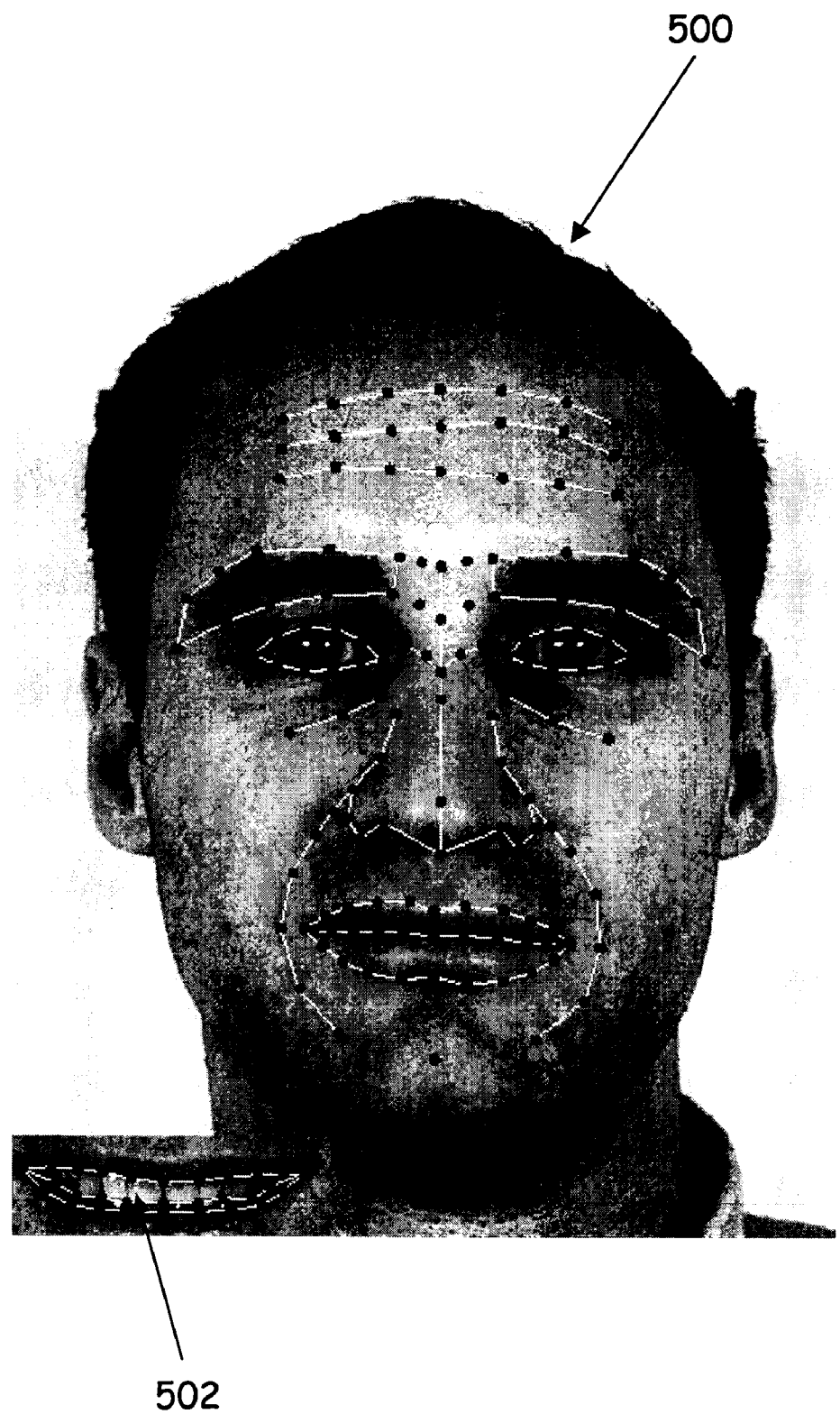
FIG. 5 is a pictorial representation of feature points.

FIG. 5 shows a picture with feature points 500 used facial image synthesis. In FIG. 5 also are the feature points 502 of the teeth area when the mouth is open. In the illustrative embodiment, there are 134 feature points in total. It should be noted it is possible to automatically compute or locate points on images such as face images as is known. However, if the number of example images 202 is small, identification of the feature points in each of the images can be done manually.

Figure 6A:
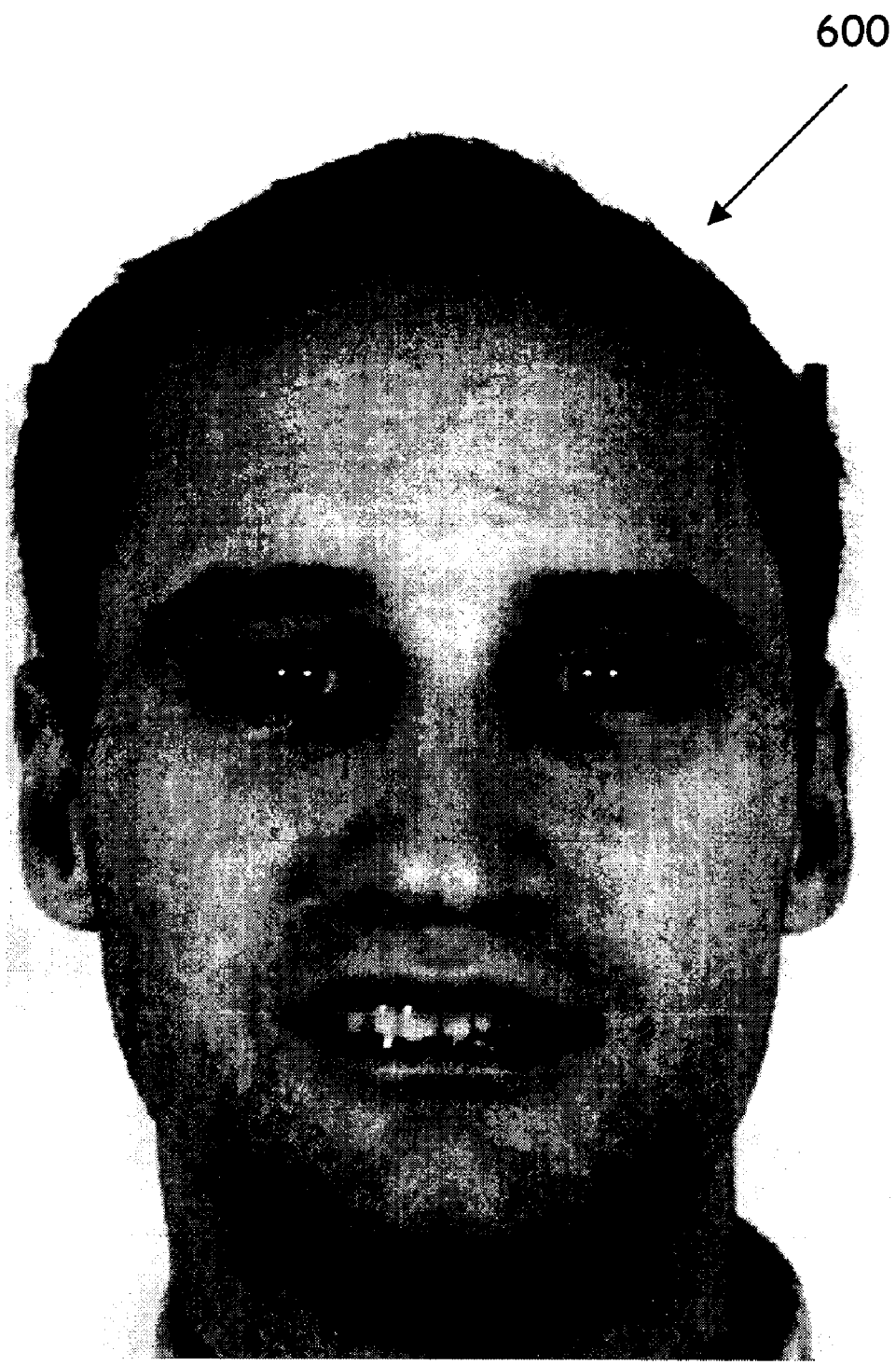
FIG. 6a is a pictorial representation of a standard or reference image.

Typically, after the feature points 500, 502 have been identified, the example images 202 are aligned with a standard or reference image 600 at step 404, which is shown in FIG. 6A. In an application such as face synthesis, a reference image is helpful in order that the texture for the teeth can be obtained when the mouth is open. Alignment can be done by using a simple triangulation based image warping, although more advanced techniques such as described in "Feature-based Image Metamorphosis," by T. Beier and S. Neely, in Computer Graphics, pages 35-42, Siggraph, July 1992, or "Animating Images with Drawings," by P. Litwinowicz and L. Williams in *Computer Graphics*, pages 235-242, Siggraph, August 1990, may be used to obtain better image quality.

Figure 7:
FIG. 7 is a pictorial representation of subregions forming a complete image.

As indicated above, depending on the image to be synthesized, it may be advantageous to divide the image into a number of subregions. Step 406 illustrates subdividing of the images. In the illustrative embodiment of a face, FIG. 7 illustrates exemplary subregions 700, which includes a subregion for the teeth when the mouth is open. A general guideline for subdividing the image into regions is the subregions may be small; however, details to be synthesized such as expression wrinkles should not cross the subregion boundaries. Each of the image examples 202 could be divided into subregions; however, since each of the image example 202 have been aligned with the standard image 600 and there exists a known relationship between these images, only the standard image needs to be subdivided. An image mask can be created and stored at step 406 in order to store the subdivision information where, for example, for each pixel, its subregion index is stored in its color channel.

Image Synthesis

Figure 8:
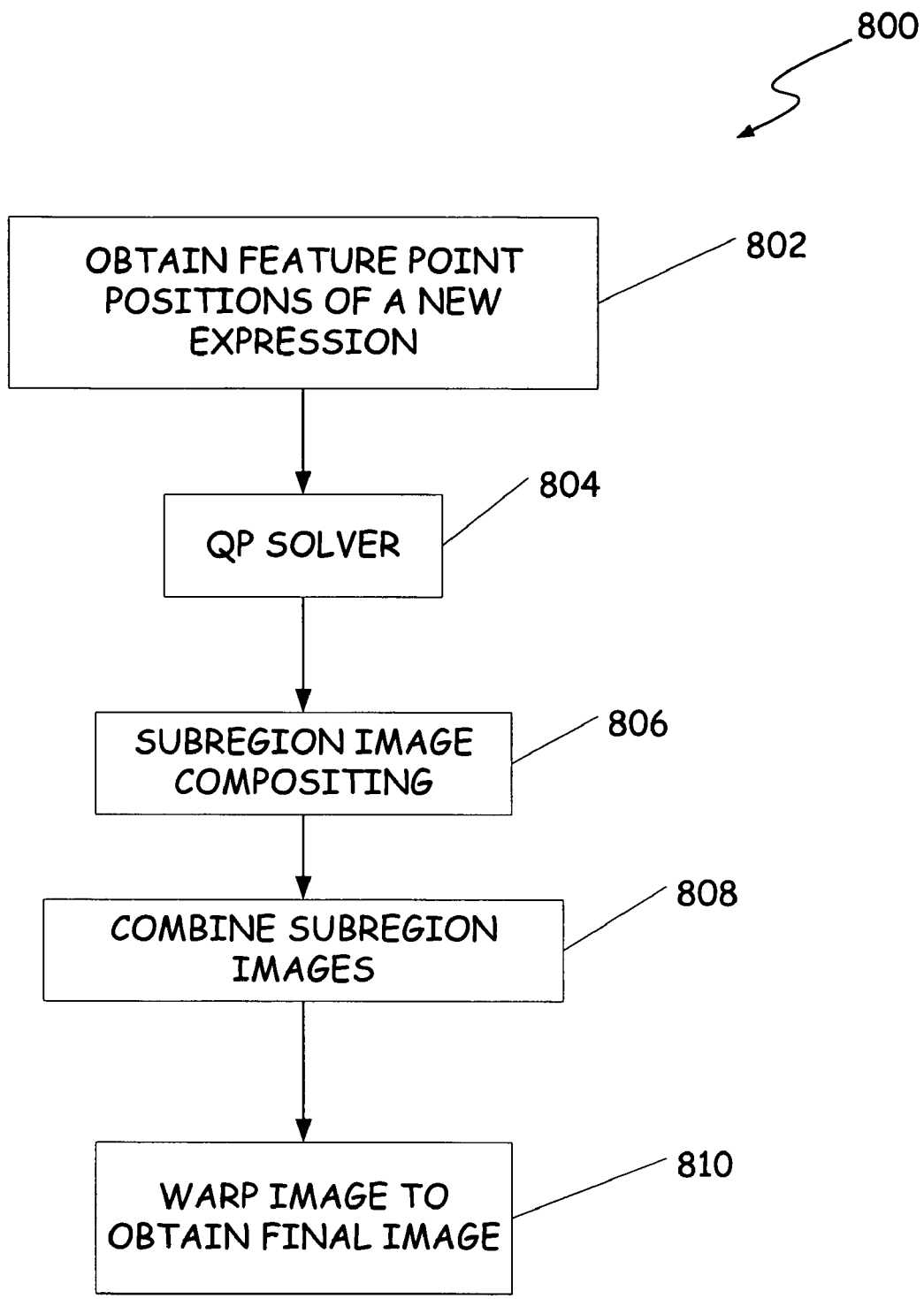
FIG. 8 is a flow chart of a method for synthesizing images.

FIG. 8 illustrates a method 800 for image synthesis using the set of registered or representative 204. At step 802 feature point positions for the image to be synthesized are obtained. An example of how such feature point positions can calculated is provided below, but for purposes of synthesis, it can be assumed these are known and obtainable at step 802. Step 802 can include translation or warping of the desired feature point positions so as to be aligned with the standard or reference image 600.

At step 804, a geometric component is calculated from which a texture component will be inferred. The geometric component can be calculated as follows.

Let n denote the number of feature points. For each example expression $E_i$, $G_i$ is used to denote the 2n dimensional vector, which includes all of the feature point positions. Let G be the feature point positions of a new expression. For each subregion R, $G_i^R$ is used to denote the feature points of $E_i$ which are in or at the boundary of R. Similarly $G^R$ is used to denote the feature points of G associated with R. Given $G^R$, this geometric component is projected into the convex hull of $G_0^R, \ldots, G_m^R$. In other words, the closest point in the convex hull is desired. This task can be formulated as an optimization problem:

$$\text{Minimize } \left(G^R - \sum_{i=0}^{m} c_i G_i^R\right)^T \left(G^R - \sum_{i=0}^{m} c_i G_i^R\right) \quad (2)$$

$$\text{Subject to: } \sum_{i=0}^{m} c_i = 1 \; c_i \geq 0, \, i = 0, 1, \ldots, m$$

Denote $$G = (G_0^R, G_1^R, \ldots, G_m^R,) \quad (3)$$

and $$C = (c_0, c_1, \ldots, c_m)^T \quad (4)$$

Then the objective function becomes $$C^T G^T G C - 2 G^{RT} G C + G^{RT} G^R \quad (5)$$

This is a quadratic programming formulation where the objective function is a positive semi definite quadratic form and the constraints are linear. Since $G_i^R$'s are in general linearly independent, the objective function is in general positive definite.

There are many known ways to solve a quadratic programming problem, for example, as described by D. G. Luenberger in *Linear and Nonlinear Programming*, Addison-Wesley Publishing Company, 1984, or Y. Ye. *Interior Point Algorithms: Theory and Analysis*, John Wiley, 1997. In the past decade, a lot of progress has been made on the interior-point methods both in theory and in practice. Interior-point methods have become very popular for solving many practical quadratic programming problems. Using an interior point method, this approach includes iterating in the interior of the domain, which is constrained by the inequality constraints. At each iteration, it uses an extension of Newton's method to find the next feasible point, which is closer to the optimum. Compared to the traditional approaches, interior point methods have faster convergence rate both theoretically and in practice, and they are numerically stable. Even though an interior point method usually does not produce the optimal solution (since it is an interior point), the solution is in general very close to the optimum.

After obtaining the coefficients $c_i$'s, the subregion image IR is computed by compositing the example images together at step 806, which can be represented as:

$$I^R = \sum_{i=0}^{m} c_i I_i^R \quad (6)$$

It should be noted that if the example images have already been aligned, this step can simply be pixel-wise color blending.

Figure 6B:
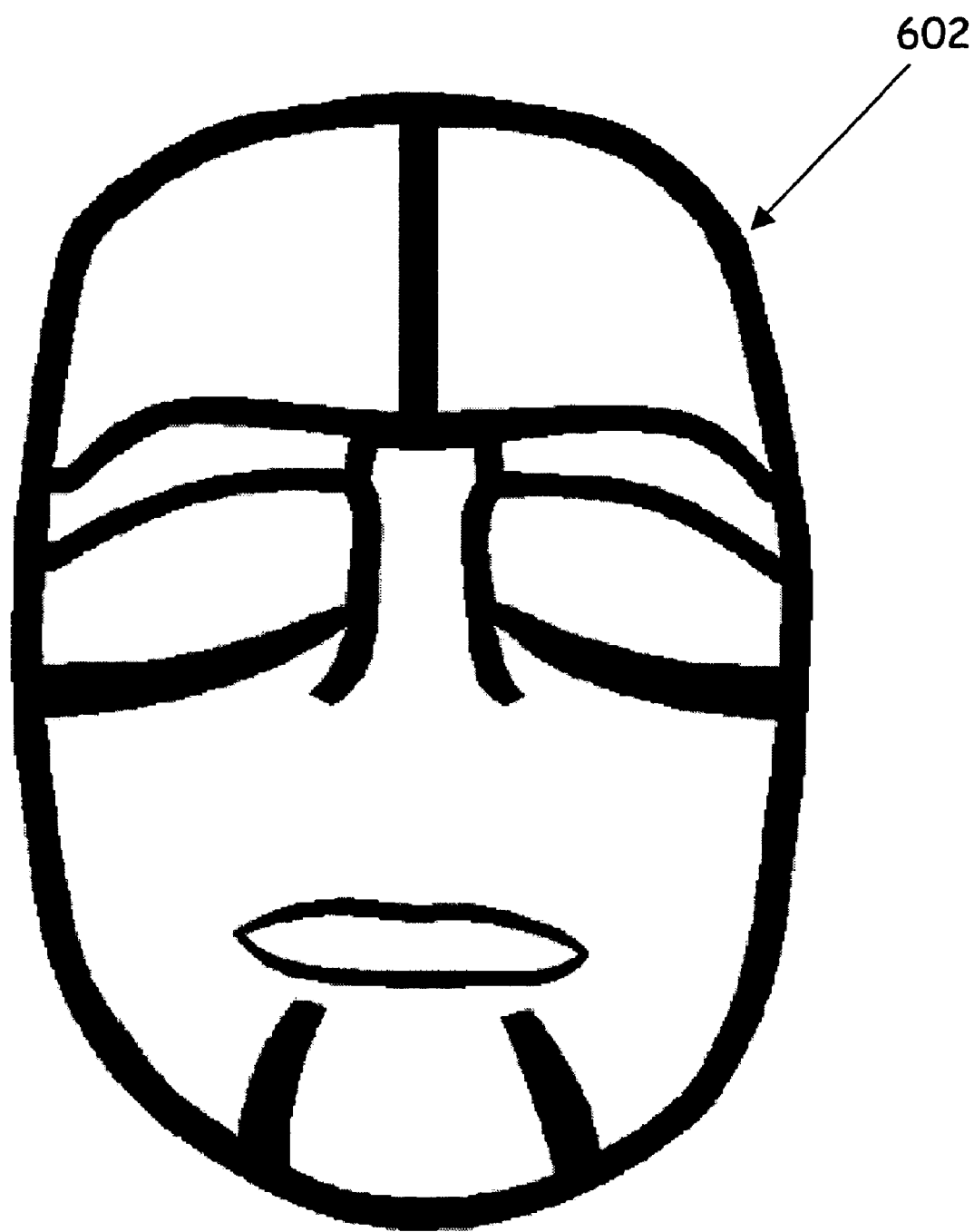
FIG. 6b is a pictorial representation of blending regions.

At step 808, the subregions of the image are combined to form the final synthesized image. In a further embodiment, step 808 can include blending along at least some of the subregion boundaries. Blending can be advantageous because it can avoid or minimize image discontinuity along the subregion boundaries. Blending can take many forms. In one embodiment, a fade-in-fade-out blending technique is used along the subregion boundaries. In one implementation, a weight map is used to facilitate the blending. FIG. 6B pictorially illustrates a weight map 602, which is aligned with the standard image 600 of FIG. 6A. The thick black curves are the blending regions along the subregion boundaries. Using color channels, the intensity of the R-channel stores the blending weight, while the G-channel and the B-channel store the indexes of the two neighboring subregions, respectively.

Given a pixel in the blending region, let r denote the value of R-channel, and let $i_1$ and $i_2$ be the indexes of the two subregions. Then its blended intensity is $$I = \frac{r}{255} * I^{i_1} + \left(1 - \frac{r}{255}\right) * I^{i_2} \qquad (7)$$

It should be noted that blending may be selected based on the types of adjoining subregions. For instance, blending may not be desired along some of the boundaries where there is a natural color discontinuity such as the boundary of the eyes and the outer boundary of the lips.

After the blending step, if performed, the resulting image obtained is aligned with the standard image. In order to obtain an image that has feature point positions that are in accordance with the input feature point positions, the image is warped or translated at step 810 to obtain the final image.

If the final image is to include a subregion that is quite orthogonal or distinct to the other regions of the image such as the teeth region as compared to the rest of the face, a separate set of examples images for the teeth region can be used and processed separately. In some embodiments, a smaller set of example images for such a region can be used. For instance, in facial expressions where the focus is not on speech animations that may require a lot of variations on mouth shapes such a technique can be used. Nevertheless, larger sets of example images can also be used to provide enough granularity to produce realistic animation of mouth movements or other forms of image movements when synthesized pictures comprise frames and are rendered sequentially.

Figure 9:
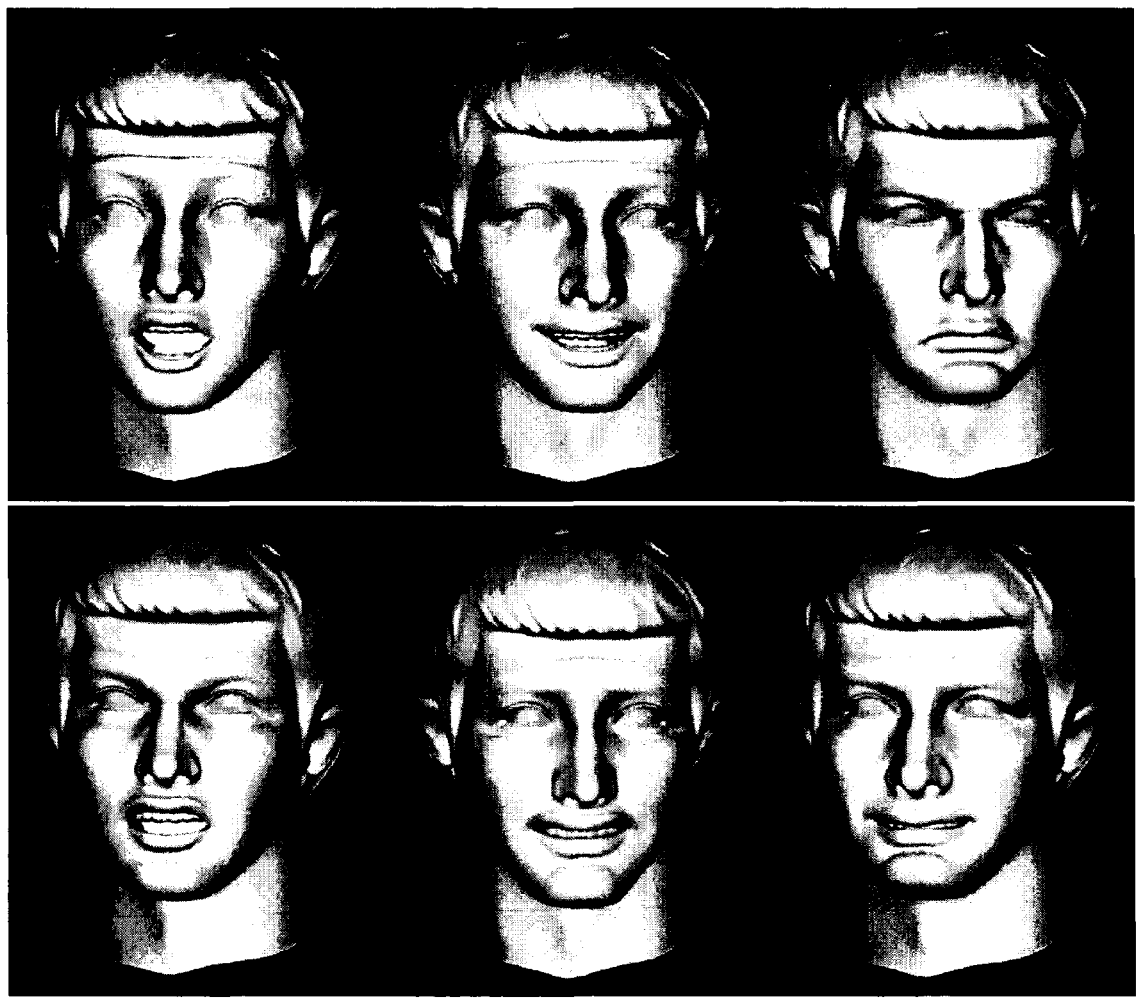
FIG. 9 pictorial representations of exemplary three-dimensional synthesized images.

At this point it should be also noted method 800 can be extended to three dimension "3D" and is not limited to two-dimensional images. In a 3D application, the feature points are not points in a substantially two-dimensional plane, but rather are positions in three dimensions. Accordingly, the synthesized images are not two-dimensional images such as facial expressions discussed above, but are synthesized 3D meshes with or without texture maps. Subregions in three dimensions can be used. To compute the sub-region blending coefficients, equation 3 is used in the same way as before except that G and $G_i$ are 3n dimensional vectors. As with the two-dimensional case, a quadratic programming problem exists, which can be solved in a similar fashion such as with the same interior point method. The sub-region mesh compositing and blending along subregion boundaries are similar to the 2D case except that the 3D vertex positions are blended instead of the images. FIG. 9 shows examples of synthesized 3D expression images.

Inferring Feature Point Motions from a Subset

In practice, it may be difficult to obtain all the feature points in an image such as the facial image of FIG. 4. For example, most of the algorithms to track face features only track a limited number of features along the eye brows, eyes, mouths, and noses. In an embodiment of expression mapping using aspects of the present invention discussed below, only 40 feature points are extracted from the performer. Likewise, for an application of expression editing that will also be discussed below, each time when a user moves a feature point, the mostly likely movement for the rest of the feature points is ascertained.

The following provides a method for inferring or ascertaining the motions for all the feature points from a subset of feature points. The method utilizes an example-based approach. The basic idea is to learn how the rest of the feature points move from the examples. In order to have a fine-grain control, which can be particularly important if only the motions of a very small number of feature points are available such as in expression editing, the feature points of an image such as a face are organized into hierarchies and hierarchical principal component analysis on the example expressions is performed. As in the foregoing, a exemplary application will be described with respect to feature points identified on an image of a face. As appreciated by those skilled in the art, this aspect can be applied to a wide variety of two and three dimensional images or representations.

In this example, three hierarchical sets of feature points are defined. At hierarchy 0, a single feature point set is defined, which controls the global movement of the entire face. There are four feature point sets at hierarchy 1, each controlling the local movement of facial feature regions (left eye region, right eye region, nose region, and mouth region). Each feature point set at hierarchy 2 controls details of the face regions, such as eyelid shape, lip line shape, etc. There are 16 feature point sets at hierarchy 2. Some feature points belong to several sets at different hierarchies, and they are used as bridges between global and local movement of the image, herein a face, so that vertex movements from one hierarchy to another can be propagated.

For each feature point set, the displacement of all the vertices belonging to this feature set for each example expression are computed. Principal component analysis on the vertex displacement vectors corresponding to the example expressions is then performed, and a lower dimensional vector space is generated. As is well-known, principal component analysis (PCA) is a mathematical procedure that transforms a number of (possibly) correlated variables into a (smaller) number of uncorrelated variables called principal components. The objective of principal component analysis is to reduce the dimensionality (number of variables) of the dataset but retain most of the original variability in the data. The first principal component accounts for as much of the variability in the data as possible, and each succeeding component accounts for as much of the remaining variability as possible.

The hierarchical principal component analysis result (i.e., principal components) is used to propagate vertex motions so that from the movement of a subset of feature points, the most reasonable movement for the rest of the feature points can be inferred. The basic idea is to learn from example images how the rest of the feature points move when a subset (at least one) of the vertices move.

Let $v_1, v_2, \ldots, v_n$ denote all the feature points on the image, herein a face. Let $\delta V$ denote the displacement vector of all the feature points. For any given $\delta V$ and a feature point set F (the set of indexes of the feature points belonging to this feature point set), $\delta V$ (F) is used to denote the sub-vector of those vertices that belong to F. Let Proj $\delta V$, F) denote the projection of $\delta V$ (F) into the subspace spanned by the principal components corresponding to F. In other words, Proj($\delta V$, F) is the best approximation of $\delta V$ (F) in the expression subspace. Given $\delta V$ and Proj($\delta V$, F), $\delta V$ is updated by Proj($\delta V$, F) if for each vertex that belongs to F, its displacement in $\delta V$ is replaced with its corresponding value in Proj($\delta V$, F).

First what will be described is how to infer the motions of all the feature points from a single vertex motion. Assume vertex $v_i$ has a motion and a vector $\delta V$ is obtained where $\delta v_i$ is equal to the displacement for vertex $v_i$, while the rest of the vertex displacements are 0. To propagate the vertex motion, the feature point set, F*, which has the lowest hierarchy among all the feature point sets containing $v_i$ is located. The method proceeds as follows where for each feature point set F, the flag hasBeenProcessed(F) is used to denote whether F has been processed or not. Initially, hasBeenProcessed(F) is set to be false for all the F.

```
MotionPropagation(F*)
Begin
    Set h to be the hierarchy of F*.
    If hasBeenProcessed(F*) is true, return.
    Compute Proj(δV,F*).
    Update δV with Proj(δV,F*).
    Set hasBeenProcessed(F*) to be true.
    For each feature set F belonging to
hierarchy
    H – 1 such that F ∩ F* ≠ ∅
        MotionPropagation(F)
    For each feature set F belonging to
hierarchy
    h+1 such that F ∩ F* ≠ ∅
        MotionPropagation(F)
End
```

Similarly, the motions of all the feature points cam be inferred from a subset. Assume a subset of the feature points: $v_{i1}, v_{i2}, \ldots, v_{ik}$ have motions. The vector $\delta V$ is set so that $\delta v_{ij}$ is equal to the displacement vector for vertex $v_{ij}$ for $j=1, \ldots, k$. For each vertex $v_{ij}$, the feature point set, $F_j$, is ascertained which has the lowest hierarchy among all the feature point sets containing $v_{ij}$, and run MotionPropagation (Fj) (notice that now $\delta V$ contains the displacement for all $v_{ij}$, $j=1, \ldots, k$).

Enhanced Expression Mapping

Expression mapping technique (also called performance-driven animation) is a simple and widely used technique for facial animations. It works by computing the difference vector of the feature point positions between the neutral face and the expression face of a performer, and then adding the difference vector to the new character's face geometry. One main drawback is that the resulting facial expressions may not look convincing due to the lack of expression details.

Figure 10:
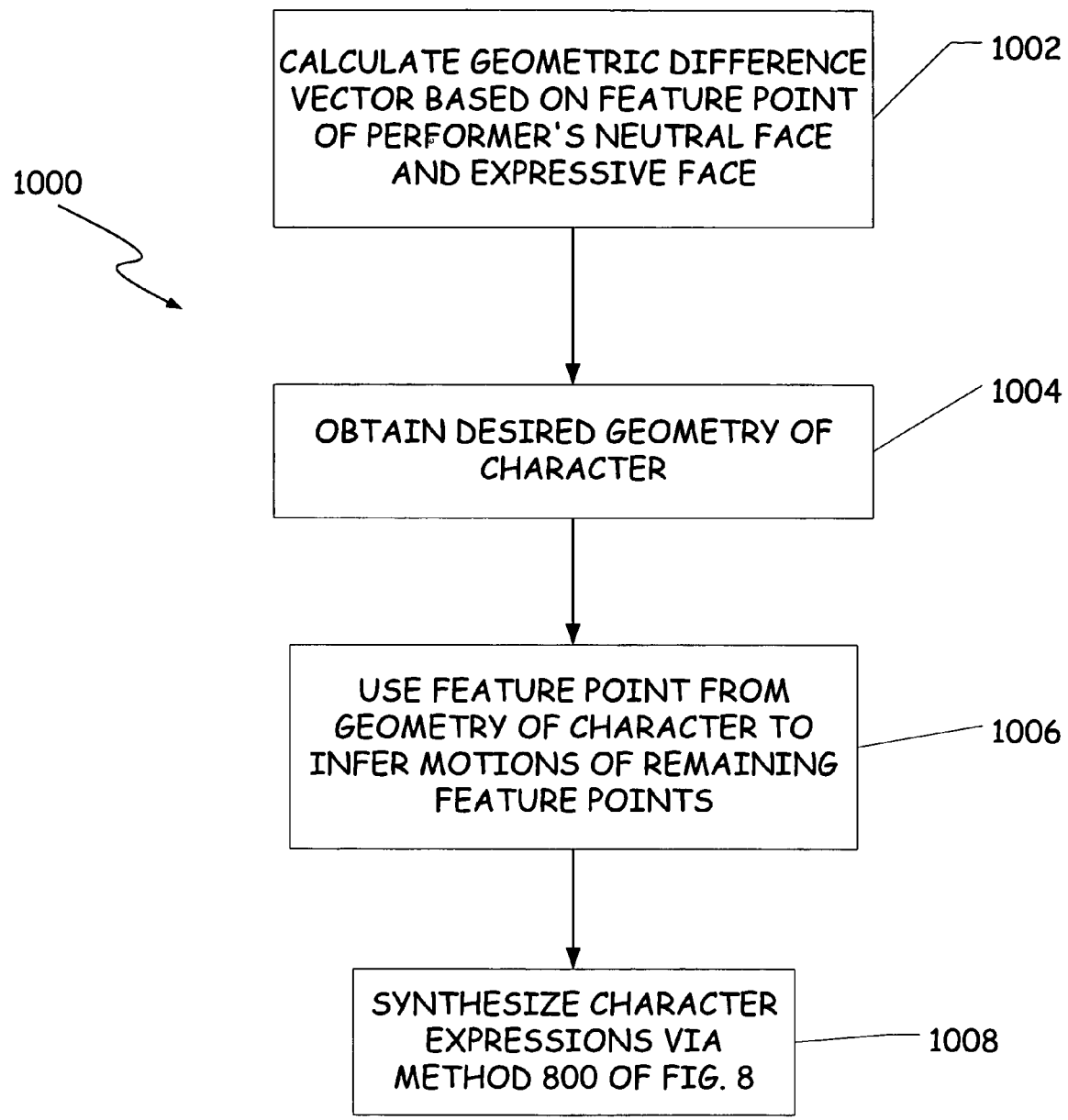
FIG. 10 is a flow chart for performing expression mapping.

Using aspects of the present invention, a solution to this problem is provided where example images for the new character can be obtained. For instance, the example images may be obtained offline through capturing or designed by an artist, where the method of FIG. 4 is used for processing. At run-time for synthesis as illustrated in FIG. 10 in method 1000, at step 1002 a geometric difference vector is calculated based on feature points of neutral face and expression face of the performer. The geometric difference vector is used to obtain the desired geometry for the new character at step 1004 as in the traditional expression mapping system. Because of the difficulty of face tracking, the number of available feature points is in general much smaller than the number of feature points needed by the synthesis system. So the technique described above is used to infer the motions for all the feature points used by the synthesis system at step 1006. The synthesis technique of method 800 described above is then used at step 1008 to generate the texture image based on the geometry. The final results are more convincing and realistic facial expressions are obtained.

For clarification purpose, it should be noted that to map a performer's expressions to the new character, example expressions from the performer are not needed. Only the feature points of the performer's expressions are needed. This is very different from the expression mapping of the prior art, which needs example expressions for both the performer and the new character and requires the correspondence between the two sets of example expressions.

Expression Editing

Another interesting application of aspects of the present invention is on interactive expression editing system. One common approach to designing facial expressions is to allow a user to interactively modify control point positions or muscle forces. The images are then warped accordingly. Aspects of the present invention can be used to enhance such systems to generate expression details interactively.

Figure 11:
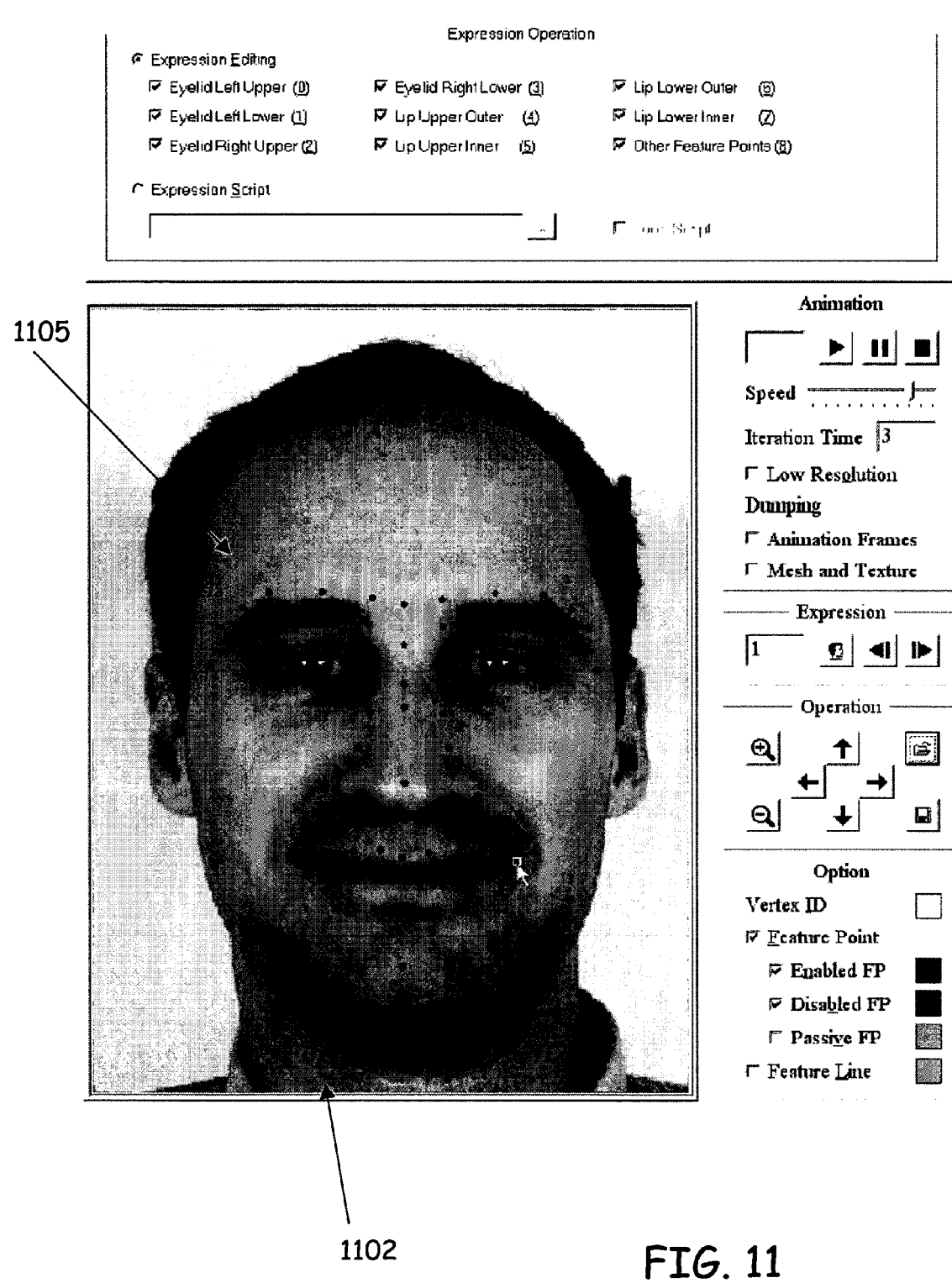
FIG. 11 is an exemplary interface for performing expression editing.

In an embodiment of a system including aspects of the present invention, a user is allowed to drag a feature point such as in a face, and the system interactively displays the resulting image with expression details. FIG. 11 is a snapshot of the expression editing interface where dots 1102 are the feature points which the user can click on and drag, or otherwise move.

Figure 12:
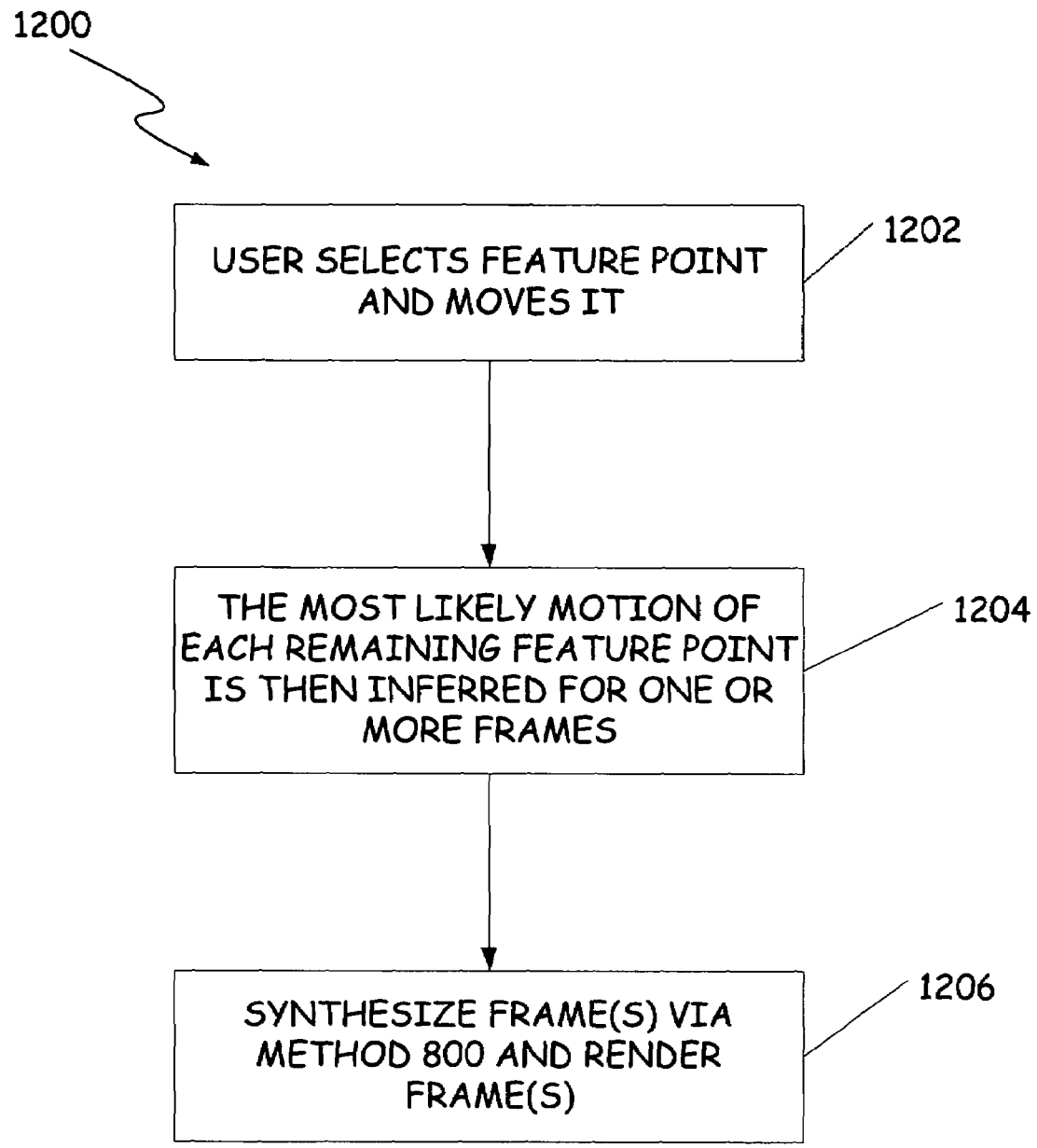
FIG. 12 is a flow chart for performing expression editing.

FIG. 12 illustrates a method 1200 for expression editing. At step 1202, a user drags or otherwise selects and moves a feature point. A geometry generator infers the "most likely" positions for all the feature points by using the method described above at step 1204. For example, if a user drags the feature point on the top of the nose, the entire nose region will move instead of just this single point. With the position of the feature points ascertained, the new image can be synthesized. In one embodiment, 30-40 example expressions for the feature point inference in both the expression editing and expression mapping applications are used.

When rendering the change of expression in the expression editor, a progression of a change in expression can be rendered. In one embodiment, 2-4 frames per second on a 2 GHz PC can be generated. Because the frame rate is not high enough, synthesis is not performed until the mouse stops moving. When the mouse stops moving, a plurality, e.g. five, geometric components for the frames between the previous mouse stop and the current mouse stop are calculated, and a synthesized expression image for each frame is then rendered in the large window 1105. At the same time, we update the image in the small window. The main computation cost is the image compositing. Currently the image compositing is done in software, and for every pixel the compositing operation is performed for all the example images even though some of the example images have coefficients close to 0. One way to increase the frame rate is to not composite those example images whose coefficients are close to 0. Another way is to use hardware acceleration.

In summary, a geometry-driven synthesis system has been described along with a feature point inference technique that can be used in two and three dimensional images. Each of these aspects are beneficial; however, the combination of these two techniques can be used to enhance the traditional expression mapping to generate facial expression details. This is the first expression mapping system, which is capable of generating expression details while only requiring the feature point motions from the performer. In addition, an expression editing application can be used where the user, while manipulating the geometric positions of the feature points, can see the resulting realistic looking facial expressions interactively. Another possibility is to extend aspects of the present invention to synthesize expressions with various poses from examples. An input can be obtained for the pose parameters as well as the feature point motions, the corresponding expression from the examples would then be synthesized. Another area which aspects of the present invention could be used is to handle lip motions during speech. One of the final goals is to be able to take the minimum information, such as the feature points, poses, and phonemes, of the performer and automatically synthesize the photorealistic facial animations for the target character.

Although the present invention has been described with reference to particular embodiments, workers skilled in the art will recognize that changes may be made in form and detail without departing from the spirit and scope of the invention.

What is claimed is:

1. A computer implemented method for rendering a single frame of a synthesized image, comprising:
    generating a desired geometric component corresponding to a selected image for the single frame based on identified feature points from a set of representative images, where each image of the set has the identified feature points with a corresponding reference image geometric component, and wherein the geometric component is a dimensional vector of feature point positions; and
    generating the selected image for the single frame from a composite of the set of representative images based on the desired geometric component; wherein the selected image and each of the set of representative images comprises a plurality of subregions defined adjacent to each other in the single frame wherein adjacent subregions share a common boundary; and wherein generating a desired geometric component is performed for each subregion, and wherein the composite of the set of representative images is based on the corresponding desired geometric component for each subregion, and the selected image includes a synthesized subregion for each subregion based on the composite by projecting the desired geometric component into the convex hull of the corresponding reference image geometric components to obtain a set of coefficient, where a coefficient is associated with a representative image, and wherein a texture of the corresponding representative image as a function of each of the associated coefficients and blending at least some boundaries between adjacent subregions of the selected image order to generate the selected image.

2. The method of claim 1 wherein at least one synthesized subregion is based on a quantity of a set of representatives different than another synthesized subregion.

3. The method of claim 1 wherein the feature points correspond to a two-dimensional image.

4. The method of claim 1 wherein the feature points correspond to a three-dimensional image.

5. The method of claim 1 wherein generating a desired geometric component corresponding to a selected image based on identified feature points on the image comprises ascertaining a position of at least one feature point from a change in position of another feature point.

6. The method of claim 5 wherein the feature points are grouped in sets, each set pertaining to a different region of the selected image, and wherein ascertaining a position of at least one feature point comprises ascertaining positions of feature points in a set from a change in position of a feature point in the set.

7. The method of claim 6 wherein ascertaining a position of at least one feature point comprises ascertaining positions of feature points in the set using principle components derived from analyzing positional changes of feature points in the set for the representative images through principle component analysis.

8. The method of claim 7 wherein ascertaining a position of at least one feature point comprises ascertaining positions of feature points in a first set from a change in position of at least one feature point in another set.

9. The method of claim 8 wherein the sets are hierarchical.

10. The method of claim 1 and further comprising:
    monitoring feature points of a user; and
    wherein generating a desired geometric component corresponding to a selected image includes generating the desired geometric component corresponding to a change in position of feature points of the user; and
    wherein generating the selected image corresponds to the change in position of feature points of the user.

11. The method of claim 10 wherein generating a desired geometric component corresponding to a selected image based on identified feature points comprises ascertaining a position of at least one feature point from a change in position of another feature point.

12. The method of claim 1 and further comprising:
    rendering an image with feature points identified thereon; and
    receiving information indicative of a user moving a feature point.

13. The method of claim 12 wherein generating a desired geometric component corresponding to a selected image based on identified feature points comprises ascertaining a position of at least one feature point from a change in position of another feature point.

14. The method of claim 1 wherein the selected image comprises a selected expression.

15. The method of claim 14 wherein the selected image comprises a selected facial expression.

16. The method of claim 1 wherein the each of the set of representative images are aligned with respect to a reference image.

17. A computer implemented method for rendering a single frame of a synthesized image based on feature points, comprising:
    accessing a set of stored representatives of various images, wherein each image of the set of the images has the same corresponding feature points associated therewith and a corresponding reference image geometric component and wherein the geometric component is a dimensional vector of feature point positions;
    ascertaining a position of at least one feature point from a change in position of another feature point based on a change in movement of the selected feature point and based on the set of stored representatives of various images; and
    rendering a new image for the single frame with two or more feature points having changed position; wherein the new image and each image in the set of stored representatives of various images comprises a plurality of subregions defined adjacent to each other wherein each subregion of the new image has associated therewith a desired geometric component, wherein adjacent subregions share a common boundary, and rendering the new image includes rendering a synthesized subregion for each subregion by projecting the desired geometric component into the convex hull of the corresponding reference image geometric components to obtain a set of coefficients, where a coefficient is associated with a representative image, and wherein a texture of the subregion of the new image is based on combining the corresponding texture of the corresponding representative image as a function of each of the associated coefficients and blending at least some boundaries between adjacent subregions in the new image.

18. The method of claim 17 wherein the feature points are grouped in sets, each set pertaining to a different region of the selected image, and wherein ascertaining a position of at least one feature point comprises ascertaining positions of feature points in a set from a change in position of one feature point in the set.

19. The method of claim 18 wherein ascertaining a position of at least one feature point comprises ascertaining positions of feature points in the set using principle components derived from analyzing positional changes of feature points in the set of stored representatives of various images through principle component analysis.

20. The method of claim 19 wherein ascertaining a position of at least one feature point comprises ascertaining positions of feature points in a first set from a change in position of at least one feature point in another set.

21. The method of claim 20 wherein the sets are hierarchical.

22. The method of claim 17 wherein at least one synthesized subregion is based on a quantity of a set of representatives different than another synthesized subregion.

23. The method of claim 17 and further comprising monitoring feature points of a user.

24. A computer implemented method for rendering a single frame of a synthesized image based on feature points, comprising:
rendering a image with identified feature points, wherein the feature points are grouped in hierarchical sets, each set pertaining to a different region of the image;
receiving information indicative of a user moving a selected feature point;
accessing a set of stored representatives of various images, wherein each image of the set of stored images has the same corresponding feature points associated therewith and a corresponding reference image geometric component, and wherein the geometric component is a dimensional vector of feature point positions;
ascertaining a position of at least one feature point in each of two different sets from a change in position of another feature point based on a change in movement of the selected feature point and based on the set of stored representatives of various images, wherein ascertaining comprises ascertaining positions of feature points in a set from a change in position of one feature point int he set using principle components derived from analyzing positional changes of feature points in the set of stored representatives of various images through principle component analysis; and
rendering a new image for the single frame with two or more feature points having changed position in two sets; wherein the new image and each image in the set of stored representatives of various images comprises a plurality of subregions adjacent to each other wherein each subregion of the new image has associated therewith a desired geometric component, wherein adjacent subregions share a common boundary, and rendering a synthesized subregion for each subregion in the new image is obtained by protecting t he desired geometric component into the convex hull of t he corresponding reference image geometric components to obtain a set of coefficients, where a coefficient is associated with a representative image, and wherein a texture of the selected image is based on combining the corresponding texture of the corresponding representative image as a function of each of the associated coefficients.

25. The method of claim 24 wherein the wherein the image comprises a facial image.

26. The method of claim 24 wherein at least one synthesized subregion is based on a quantity of a set of representatives different than another synthesized subregion.

27. The method of claim 1 wherein the each geometric component is calculated based on an objective function that is defined by a constraint and a plurality of feature points.

28. The method of claim 27 wherein the objective function is a positive semi definite quadratic form and the constraints are linear.

29. The method of claim 1 wherein blending is performed by identifying intensity values for adjacent regions on either side of the at least some boundaries and calculating an intensity value for the at least some of the boundaries based on the intensity values.

30. The method of claim 17 wherein blending is performed by identifying intensity values for adjacent regions on either side of the at least some boundaries and calculating an intensity value for the at least some of the boundaries based on the intensity values.

* * * * *